(12) United States Patent
Jiao et al.

(10) Patent No.: US 12,021,765 B2
(45) Date of Patent: Jun. 25, 2024

(54) CHANNEL INFORMATION SENDING METHOD AND APPARATUS AND CHANNEL INFORMATION RECEIVING METHOD AND APPARATUS

(71) Applicant: HUAWEI TECHNOLOGIES CO., LTD., Guangdong (CN)

(72) Inventors: Shurong Jiao, Shanghai (CN); Meng Hua, Shanghai (CN); Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 404 days.

(21) Appl. No.: 17/376,521

(22) Filed: Jul. 15, 2021

(65) Prior Publication Data

US 2021/0344462 A1   Nov. 4, 2021

Related U.S. Application Data

(63) Continuation of application No. PCT/CN2019/130410, filed on Dec. 31, 2019.

(30) Foreign Application Priority Data

Jan. 16, 2019   (CN) .......................... 201910041688.0

(51) Int. Cl.
*H04L 5/00*  (2006.01)
*H04L 1/00*  (2006.01)

(52) U.S. Cl.
CPC .......... *H04L 5/0016* (2013.01); *H04L 1/0003* (2013.01); *H04L 1/0026* (2013.01); *H04L 5/0051* (2013.01)

(58) Field of Classification Search
CPC ..... H04L 1/0026; H04L 5/0048; H04L 5/005; H04L 5/0051; H04L 5/0053; H04L 5/0094

See application file for complete search history.

(56) References Cited

U.S. PATENT DOCUMENTS

2018/0278395 A1* 9/2018 Yoon ..................... H04L 5/0051
2019/0165910 A1* 5/2019 Lee ....................... H04L 5/0048
(Continued)

FOREIGN PATENT DOCUMENTS

| CN | 102045762 A | 5/2011 |
| CN | 102170335 A | 8/2011 |

(Continued)

OTHER PUBLICATIONS

Office Action issued in Chinese Application No. 201910041688.0 on Dec. 24, 2020, 16 pages (with English translation).

(Continued)

*Primary Examiner* — Pao Sinkantarakorn
(74) *Attorney, Agent, or Firm* — Fish & Richardson P.C.

(57) ABSTRACT

Channel information sending methods or channel information receiving methods are provided. One example method includes that a network device configures for a terminal device Q DMRS ports used for measurement, where the Q DMRS ports used for measurement include M DMRS ports that can carry downlink data, and Q is greater than M; and selects, based on channel information of P DMRS ports that is sent by the terminal device, an appropriate DMRS port to send the downlink data, where the P DMRS ports belong to the Q DMRS ports used for measurement.

12 Claims, 3 Drawing Sheets

(56) References Cited

U.S. PATENT DOCUMENTS

| | | | | |
|---|---|---|---|---|
| 2020/0153543 A1* | 5/2020 | Khoshnevisan | | H04W 72/23 |
| 2021/0376888 A1* | 12/2021 | Cao | | H04L 5/0048 |
| 2022/0085929 A1* | 3/2022 | Ren | | H04L 27/2613 |
| 2022/0116247 A1* | 4/2022 | Sengupta | | H04L 5/0094 |

FOREIGN PATENT DOCUMENTS

| | | | |
|---|---|---|---|
| CN | 102761401 A | | 10/2012 |
| CN | 108282210 A | | 7/2018 |
| CN | 108282807 A | | 7/2018 |
| CN | 108540995 A | | 9/2018 |
| WO | 2018127141 A1 | | 7/2018 |
| WO | 2018204774 A1 | | 11/2018 |

OTHER PUBLICATIONS

Office Action issued in Chinese Application No. 201910041688.0 on Jun. 9, 2021, 16 pages (with English translation).

PCT International Search Report and Written Opinion issued in International Application No. PCT/CN2019/130410 on Mar. 17, 2020, 17 pages (with English translation).

Extended European Search Report issued in European Application No. 19910383.9 on Mar. 29, 2022, 10 pages.

Huawei, HiSilicon, "Feature lead summary 2 of the remaining issues for RS multiplexing," 3GPP TSG RAN WG1 Meeting #92, R1-1803488, Athens, Greece, Feb. 26-Mar. 2, 2018, 12 pages.

Itl et al., "DMRS pattern configuration for NR," 3GPP TSG RAN WG1 NR Ad-Hoc#2, R1-1711350, Qingdao, China, Jun. 27-30, 2017, 4 pages.

\* cited by examiner

CHANNEL INFORMATION SENDING METHOD AND APPARATUS AND CHANNEL INFORMATION RECEIVING METHOD AND APPARATUS

CROSS-REFERENCE TO RELATED APPLICATION

This application is a continuation of International Application No. PCT/CN2019/130410, filed on Dec. 31, 2019, which claims priority to Chinese Patent Application No. 201910041688.0, filed on Jan. 16, 2019. The disclosures of the aforementioned applications are hereby incorporated by reference in their entireties.

TECHNICAL FIELD

This application relates to the communications field, and in particular, to a channel information sending method and apparatus and a channel information receiving method and apparatus.

BACKGROUND

In a fifth generation (5G) mobile communications system, a terminal device may obtain, by measuring a DMRS sent on at least one demodulation reference signal (DMRS) port, channel state information (CSI) that represents channel quality. The terminal device reports the obtained CSI to a network device, and the network device selects, based on the received CSI, a DMRS port that meets a channel quality requirement from the at least one DMRS port to send downlink data.

However, channel quality of the at least one DMRS port may suddenly deteriorate, which is unfavorable for the network device to select a downlink data channel that meets the channel quality requirement to send the downlink data.

SUMMARY

This application provides a channel information sending method and apparatus and a channel information receiving method and apparatus.

According to a first aspect, this application provides a channel information sending method. The method includes: receiving configuration information from a network device, where the configuration information is used to configure Q DMRS ports used for measurement, and Q is a positive integer; receiving indication information from the network device, where the indication information is used to indicate M DMRS ports, in the Q DMRS ports used for measurement, that carry downlink data, M is a positive integer, and Q is greater than M; and sending channel information of P DMRS ports to the network device, where the P DMRS ports belong to the Q DMRS ports used for measurement, and P is a positive integer.

According to the technical solution provided in the first aspect, on one hand, because a quantity Q of the DMRS ports configured to be measured by a terminal device is greater than a quantity M of the DMRS ports that carry the downlink data, the DRMS ports that can be measured by the terminal device are not limited to the M DMRS ports that carry the downlink data; on the other hand, the channel information of the P DMRS ports reported by the terminal device to the network device is not limited to that of the M DMRS ports, but is decided by the terminal device, which serves as a downlink data receiver. Therefore, the reported channel information of the P DMRS ports can reflect a channel measurement policy of the terminal device. After the network device obtains the channel measurement policy of the terminal device, the network device may select a downlink channel that meets a channel quality requirement as much as possible even in a case in which channel quality suddenly deteriorates.

For example, if channel quality of the M DMRS ports that carry the downlink data cannot meet the channel quality requirement, and there are DMRS ports that do not carry the downlink data but meet the channel quality requirement among the Q DMRS ports, the terminal device may report channel information of these DMRS ports (for example, identifiers of these DMRS ports) that do not carry the downlink data but meet the channel quality requirement, so that the network device transmits the downlink data by using the DMRS ports that meet the channel quality requirement.

Optionally, the P DMRS ports belong to P1 DMRS port groups, and a quantity of DMRS ports included in each of the P1 DMRS port groups is M.

For example, if a quantity of DMRS ports that currently carry the downlink data is two, the terminal device may use every two DMRS ports as one DMRS port group to report channel information. In this way, when switching a DMRS port that carries the downlink data, the network device may select a DMRS port group from the DMRS port groups reported by the terminal device, and does not need to select several DMRS ports from a plurality of DMRS ports first and then use the several DMRS ports as a DMRS port group to carry the downlink data, thereby reducing workload of selection for the network device and a communication delay between the network device and the terminal device.

Optionally, the P1 DMRS port groups include at least a first DMRS port group and a second DMRS port group, and the first DMRS port group and the second DMRS port group correspond to different code division multiplexing (CDM) groups.

Time-frequency resources occupied by DMRS ports that belong to a same CDM group are the same. Therefore, when one DMRS port in the CDM group does not meet the channel quality requirement, channel quality of all the DMRS ports in the CDM group may not meet the channel quality requirement. Therefore, the terminal device reports channel information of DMRS ports that belong to different CDM groups, so that redundancy of information about DMRS ports that belong to a same CDM group in the P DMRS ports can be reduced.

Optionally, the P1 DMRS port groups are DMRS port groups of best channel quality among DMRS port groups to which the Q DMRS ports belong. For the DMRS port group of the best channel quality described in this application, an optional explanation is that channel quality of each DMRS port in the DMRS port group is greater than a threshold. There may be one or at least two DMRS port groups of best channel quality.

Optionally, the P1 DMRS port groups include one DMRS port group to which the M DMRS ports that carry the downlink data belong and P1-1 DMRS port groups of best channel quality among DMRS port groups to which other DMRS ports belong, where the other DMRS ports are DMRS ports other than the M DMRS ports that carry the downlink data in the Q DMRS ports used for measurement.

Switching the DMRS port that carries the downlink data causes an increase in a communication delay. Therefore, the foregoing solution may enable the network device to determine, based on channel quality and the communication delay caused by switching of the DMRS port, whether the DMRS port that currently carries the downlink data needs to be switched. For example, if the DMRS port that currently carries the downlink data is not a DMRS port of best channel quality, and the communication delay caused by switching of the DMRS port is greater than a communication delay caused by relatively poor channel quality, the network device may choose to continue to use the DMRS port that currently carries the downlink data for communication.

Optionally, the channel information includes numbers of the P1 DMRS port groups.

Because a frequency domain resource occupied by a DMRS port is known to both the terminal device and the network device, the channel information reported by the terminal device may include only the numbers of the P1 DMRS port groups, thereby having an advantage of reporting a relatively small amount of data.

Optionally, the channel information further includes at least one of a channel quality indicator CQI of the P1 DMRS port groups, and modulation and coding scheme MCS information of the P1 port groups.

The CQI and the MCS information belong to different types of CSI. In the solution provided in this embodiment, the channel information may further include one or more types of CSI, to provide more detailed data for the network device to determine a better downlink channel.

According to a second aspect, this application provides a channel information receiving method. The method includes: sending configuration information to a terminal device, where the configuration information is used to configure Q DMRS ports used for measurement, and Q is a positive integer; sending indication information to the terminal device, where the indication information is used to indicate M DMRS ports, in the Q DMRS ports used for measurement, that carry downlink data, M is a positive integer, and Q is greater than M; and receiving channel information of P DMRS ports from the terminal device, where the P DMRS ports belong to the Q DMRS ports used for measurement, and P is a positive integer.

The technical solution in the second aspect is performed by a network device, corresponds to the technical solution in the first aspect, and has a technical solution similar to or the same as that in the first aspect. For details, refer to the first aspect.

Optionally, the P DMRS ports belong to P1 DMRS port groups, and a quantity of DMRS ports included in any one of the P1 DMRS port groups is M.

For example, if a quantity of DMRS ports that currently carry the downlink data is two, the terminal device may use every two DMRS ports as one DMRS port group to report channel information. In this way, when switching a DMRS port that carries the downlink data is needed, the network device may select a DMRS port group from DMRS port groups reported by the terminal device, and does not need to first select several DMRS ports from a plurality of DMRS ports and then use the several DMRS ports as a DMRS port group to carry the downlink data, thereby reducing workload of selection for the network device and a communication delay.

Optionally, the P1 DMRS port groups include a first DMRS port group and a second DMRS port group, and the first DMRS port group and the second DMRS port group correspond to different CDM groups.

Time-frequency resources occupied by DMRS ports that belong to a same CDM group are the same. Therefore, when one DMRS port in the CDM group does not meet a channel quality requirement, channel quality of all the DMRS ports in the CDM group may not meet the channel quality requirement. The terminal device reports channel information of DMRS ports that belong to different CDM groups, to help the network device select a DMRS port of better channel quality, and reduce reported information redundancy (that is, information about DMRS ports that belong to a same CDM group in the P DMRS ports does not need to be reported).

Optionally, the P1 DMRS port groups are DMRS port groups of best channel quality among DMRS port groups to which the Q DMRS ports belong. The DMRS port group of the best channel quality described in this application means that channel quality of all DMRS ports in the DMRS port group is greater than a preset threshold. There may be one or at least two DMRS port groups of best channel quality.

Optionally, the P1 DMRS port groups include one DMRS port group to which the M DMRS ports that carry the downlink data belong and P1-1 DMRS port groups of best channel quality among DMRS port groups to which other DMRS ports belong, where the other DMRS ports are DMRS ports other than the M DMRS ports that carry the downlink data in the Q DMRS ports used for measurement.

Switching the DMRS port that carries the downlink data causes an increase in a communication delay. Therefore, the network device may determine, based on the channel quality and the communication delay caused by switching of the DMRS port, whether the DMRS port that currently carries the downlink data needs to be switched. For example, if the DMRS port that currently carries the downlink data is not a DMRS port of best channel quality, and the communication delay caused by switching of the DMRS port is greater than a communication delay caused by the relatively poor channel quality, the network device may choose to continue to use the DMRS port that currently carries the downlink data for communication.

Optionally, the channel information includes numbers of the P1 DMRS port groups.

Because a frequency domain resource occupied by a DMRS port is known to both the terminal device and the network device, the channel information reported by the terminal device may include only the numbers of the P1 DMRS port groups, thereby having an advantage of reporting a relatively small amount of data.

Optionally, the channel information further includes at least one of a channel quality indicator CQI of the P1 DMRS port groups, and modulation and coding scheme MCS information of the P1 port groups.

The CQI and the MCS information belong to different types of CSI. In the solution provided in this embodiment, the channel information may further include one or more types of CSI, to provide more detailed data for the network device to determine a better downlink channel.

According to a third aspect, this application provides a channel information sending apparatus. The apparatus may implement functions corresponding to the method involved in the foregoing first aspect, and the functions may be implemented by hardware, or may be implemented by hardware executing corresponding software. The hardware or the software includes one or more units or modules corresponding to the foregoing functions.

In a possible design, the apparatus includes a processor. The processor is configured to support the apparatus in performing the method involved in the foregoing first aspect. The apparatus may further include a memory. The memory is configured to be coupled to the processor, and stores program instructions and data. Optionally, the apparatus further includes a transceiver. The transceiver is configured to support communication between the apparatus and a network device. The transceiver may include an independent receiver and an independent transmitter, or the transceiver may include a circuit integrating a sending function and a receiving function.

According to a fourth aspect, this application provides a channel information receiving apparatus. The apparatus may implement functions corresponding to the method involved in the foregoing second aspect, and the functions may be implemented by hardware, or may be implemented by hardware executing corresponding software. The hardware or the software includes one or more units or modules corresponding to the foregoing functions.

In a possible design, the apparatus includes a processor. The processor is configured to support the apparatus in performing the method involved in the foregoing second aspect. The apparatus may further include a memory. The memory is configured to be coupled to the processor, and stores program instructions and data. Optionally, the apparatus further includes a transceiver. The transceiver is configured to support communication between the apparatus and a terminal device. The transceiver may include an independent receiver and an independent transmitter, or the transceiver may include a circuit integrating a sending function and a receiving function.

According to a fifth aspect, this application provides a computer-readable storage medium. The computer-readable storage medium stores a computer program, and when the computer program is executed by a processor, the processor is enabled to perform the method according to the first aspect.

According to a sixth aspect, this application provides a computer-readable storage medium. The computer-readable storage medium stores a computer program, and when the computer program is executed by a processor, the processor is enabled to perform the method according to the second aspect.

According to a seventh aspect, this application provides a computer program product. The computer program product includes computer program code, and when the computer program code is run by a processor, the processor is enabled to perform the method according to the first aspect.

According to an eighth aspect, this application provides a computer program product. The computer program product includes computer program code, and when the computer program code is run by a processor, the processor is enabled to perform the method according to the second aspect.

DESCRIPTION OF EMBODIMENTS

The following describes technical solutions of this application with reference to accompanying drawings.

Figures 1, 2:
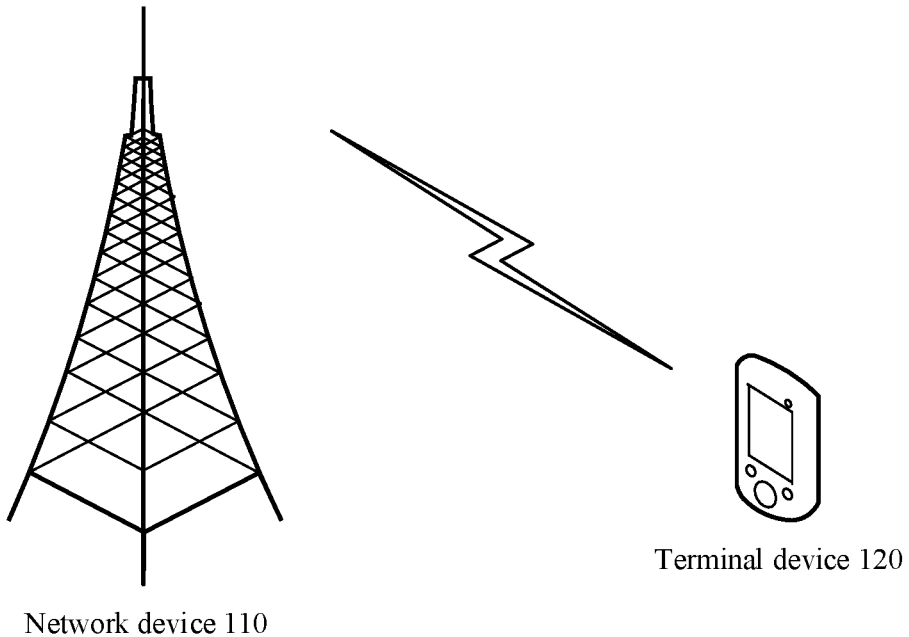
FIG. 1 is a schematic diagram of a communication system applicable to this application.
FIG. 2 is a schematic diagram of a channel information sending method according to this application.

An application scenario of this application is first described. FIG. 1 is a schematic diagram of a communication system 100 applicable to this application.

The communication system 100 includes a network device 110 and a terminal device 120. The terminal device 120 communicates with the network device 110 by using an electromagnetic wave.

In this application, the terminal device 120 may include various handheld devices, vehicle-mounted devices, wearable devices, or computing devices that have a wireless communication function, or other processing devices connected to a wireless modem, for example, user equipment (UE) defined in the 3rd generation partnership project (3GPP), a mobile station (MS), a soft terminal, a home gateway, or a set-top box.

The network device 110 may be a base station defined in 3GPP, for example, a gNB in a 5G communication system. The network device 110 may alternatively be a non-3GPP access network device, for example, an access gateway (AG). Alternatively, the network device may be a relay station, an access point, a vehicle-mounted device, a wearable device, or a device of another type.

In the communication system 100, the network device 110 may send at least one DMRS (one DMRS corresponds to one DMRS port) to the terminal device 120. The terminal device 120 separately performs channel estimation based on the at least one DMRS to obtain channel information of at least one DMRS port, and reports the channel information to the network device 110. The network device 110 may select, based on the channel information, a DMRS port that meets a channel quality requirement from the at least one DMRS port to send downlink data. Channel information of one DMRS port is used to indicate a feature of a channel on which the DMRS port is located, for example, a number of the DMRS port. The channel information may also be channel state information (CSI), for example, a value of a channel quality indicator (CQI), a rank indicator (rank indicator, RI) of a channel matrix, or a precoding matrix indicator (PMI). That the channel quality requirement is met may be explained as follows: Channel quality meets a preset threshold. For example, the value of the channel quality indicator is greater than the preset threshold, or a channel capacity determined according to the Shannon theorem is greater than the preset threshold. It should be noted that, because the downlink data is usually carried on a PDSCH, unless otherwise specified, terms "downlink data" and "PDSCH" are usually used in an equivalent manner.

In a conventional technology, a method for reporting channel information (for example, the foregoing CSI) is as follows: The channel information of a DMRS port is obtained based on measurement of the DMRS port on a downlink data channel (for example, a physical downlink shared channel (PDSCH)). Subsequently, the terminal device 120 reports the channel information to the network device 110 on a reporting resource indicated by downlink control information (DCI), where the reporting resource is, for example, a physical uplink control channel (PUCCH) resource.

The following briefly describes a configuration method and usage of a DMRS.

There are two configuration types of a port (that is, a DMRS port) for sending the DMRS, which are respectively a configuration type 1 and a configuration type 2. The former corresponds to eight ports p (1000 to 1007), and the latter corresponds to 12 ports p (1000 to 1011). The network device 110 may configure, by using a higher-layer parameter (for example, dmrs-Type), a configuration type to be used by the terminal device 120.

Table 1 shows configuration content of the configuration type 1.

TABLE 1

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

In Table 1, Δ is used to indicate a frequency domain position offset of the DMRS, and a unit of the offset is one subcarrier. $w_f(k')$ is a frequency-domain orthogonal code, and $w_t(l')$ is a time-domain orthogonal code.

Table 1 includes two groups of ports corresponding to different CDM groups. One group of ports are 1000, 1001, 1004, and 1005, and the other group of ports are 1002, 1003, 1006, and 1007. The UE may consider that channel characteristics experienced by signals received on ports (for example, 1000, 1001, 1004, and 1005) corresponding to a same CDM group are quasi co-located, and these channel characteristics are, for example, a Doppler frequency shift, Doppler spread, an average delay, and delay spread.

For example, other parameters but $w_f(k')$ corresponding to the port 1000 and the port 1001 are the same. In other words, time-frequency resource positions of DMRSs on the two ports are the same, and orthogonality is implemented by using a frequency-domain orthogonal code. The terminal device can obtain through distinguishing, based on the frequency-domain orthogonal code, the DMRSs on the two ports that belong to a same CDM group, to separately obtain data transmitted on the two ports.

For another example, other parameters but $w_t(l')$ corresponding to the port 1000 and the port 1004 are the same. In other words, time-frequency resource positions of DMRSs on the two ports are the same, and orthogonality is implemented by using a time-domain orthogonal code. The terminal device can obtain through distinguishing the DMRSs on the two ports based on the time-domain orthogonal code, to separately obtain data transmitted on the two ports.

Table 2 shows configuration content of the configuration type 2. Meanings of parameters in Table 2 are the same as meanings of the parameters in Table 1. A difference between Table 2 and Table 1 lies in that Table 2 has four more ports than Table 1. In Table 2, 12 ports each capable of sending a DMRS are configured in total, and the 12 ports correspond to three CDM groups.

TABLE 2

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |

TABLE 2-continued

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1010 | 2 | 4 | +1 | +1 | +1 | −1 |
| 1011 | 2 | 4 | +1 | −1 | +1 | −1 |

In an R15 version of the 5G standard, a DMRS and a physical downlink shared channel (PDSCH) are sent on a same DMRS port. A quantity of ports used by the DMRS and a port number are the same as those of the PDSCH. In addition, the quantity of ports and the port number are indicated on a physical downlink control channel (PDCCH) corresponding to the PDSCH, and an indicator field is Antenna port(s). A size of the indicator field is four to six bits and is determined by parameters dmrs-Type and maxLength.

TABLE 3

One codeword:
Codeword 0 means enabled, and
codeword 1 means disabled

| Value | Quantity of DMRS CDM groups without data | DMRS port |
|---|---|---|
| 0 | 1 | 0 |
| 1 | 1 | 1 |
| 2 | 1 | 0 and 1 |
| 3 | 2 | 0 |
| 4 | 2 | 1 |
| 5 | 2 | 2 |
| 6 | 2 | 3 |
| 7 | 2 | 0 and 1 |
| 8 | 2 | 2 and 3 |
| 9 | 2 | 0 to 2 |
| 10 | 2 | 0 to 3 |
| 11 | 2 | 0 and 2 |
| 12 to 15 | Reserved | Reserved |

Table 3 shows four PDSCH DMRS ports (that is, ports 0 to 3 shown in the third column) supported by the terminal device when a DMRS type is 1 and a maximum length is 1. The parameter dmrs-Type indicates the DMRS configuration type, and the parameter maxLength indicates a maximum quantity of front-loaded DMRS symbols. A value of a DMRS port is an abbreviation. To be specific, "0" indicates 1000 and "1" indicates 1001. Table 3 includes 16 indexes, that is, values 0 to 15, which means that a size of an Antenna port(s) field is four bits.

It can be learned from Table 1 that, when dmrs-Type=1, the network device 110 configures eight DMRS ports for the terminal device 120, and the network device 110 may further indicate, through the four-bit Antenna port(s) field on the PDCCH, a DMRS port actually used by the PDSCH currently. For example, when the four bits are 0000, the value in Table 3 is correspondingly 0, and it indicates that only one DMRS port, namely, the port 1000, is currently sending the DMRS and the PDSCH. When the foregoing four bits are 0010, the "value" in Table 3 is correspondingly 2, and it indicates that two ports, namely, the ports 1000 and 1001, are currently sending DMRSs and PDSCHs.

"Quantity of DMRS CDM groups without data" in the second column of Table 3 indicates: No PDSCH and DMRS of the terminal device 120 are carried on resources corresponding to DMRS ports in the quantity of CDM groups. However, the network device 110 may use these resources to send information about another terminal device different from the terminal device 120, for example, carry a PDSCH and a DMRS of the another terminal device. The terminal device 120 may ignore receiving of information carried on time-frequency resources corresponding to these DMRS ports, but may perform rate matching defined in 3GPP on the time-frequency resources corresponding to these DMRS ports. Values 1, 2, and 3 of the "quantity of DMRS CDM groups without data" correspond to CDM groups {0}, {0, 1}, and {0, 1, 2} respectively. For example, when a value indicated by the four-bit Antenna port(s) field is 0 in the first column in Table 3, a value of the "quantity of DMRS CDM groups without data" is 1, and the terminal device 120 determines to use the CDM group {0} to receive information. It can be learned from Table 1 that ports corresponding to the CDM group {0} are 1000, 1001, 1004, and 1005. Based on content in the third column in Table 3, the terminal device 120 determines that only a time-frequency resource corresponding to the port 1000 currently carries the DMRS and the PDSCH that are sent by the network device 110 to the terminal device 120, and time-frequency resources corresponding to the other three ports (1001, 1004, and 1005) do not carry the DMRS and the PDSCH that are sent by the network device 110 to the terminal device 120. The terminal device 120 ignores information carried on the time-frequency resources corresponding to the other three ports, but the terminal device 120 may perform rate matching on the time-frequency resources corresponding to the three ports.

In a conventional technology, a network device may use at most two codewords to send a PDSCH, where each codeword corresponds to a modulation and coding scheme (MCS) and a hybrid automatic repeat request (HARQ) process, and each HARQ process corresponds to a HARQ identifier. For example, the codeword 0 corresponds to a HARQ process X. The terminal device 120 feeds back acknowledgment (ACK) information to the network device in the HARQ process X to indicate that the PDSCH is correctly received, and feeds back negative acknowledgement (NACK) information to the network device in the HARQ process X to indicate that the PDSCH is not correctly received. Similarly, the codeword 1 corresponds to a HARQ process Y. The terminal device 120 uses a similar feedback manner in the HARQ process Y.

Table 3 corresponds to a case in which the network device is configured to perform sending by using a single codeword. In this case, the codeword 0 means enabled, and the codeword 1 means disabled. When the network device is configured to be capable of using two codewords for sending, a port configuration is shown in Table 4.

TABLE 4

| | One codeword: Codeword 0 means enabled, and codeword 1 means disabled | | | | Two codewords: Codeword 0 means enabled, and codeword 1 means enabled | | |
|---|---|---|---|---|---|---|---|
| Value | Quantity of DMRS CDM groups without data | DMRS port | Quantity of front-load symbols | Value | Quantity of DMRS CDM groups without data | DMRS port | Quantity of front-load symbols |
| 0 | 1 | 0 | 1 | 0 | 2 | 0 to 4 | 2 |
| 1 | 1 | 1 | 1 | 1 | 2 | 0, 1, 2, 3, 4, and 6 | 2 |
| 2 | 1 | 0 and 1 | 1 | 2 | 2 | 0, 1, 2, 3, 4, 5, and 6 | 2 |
| 3 | 2 | 0 | 1 | 3 | 2 | 0, 1, 2, 3, 4, 5, 6, and 7 | 2 |
| 4 | 2 | 1 | 1 | 4 to 31 | Reserved | Reserved | Reserved |
| 5 | 2 | 2 | 1 | | | | |
| 6 | 2 | 3 | 1 | | | | |
| 7 | 2 | 0 and 1 | 1 | | | | |
| 8 | 2 | 2 and 3 | 1 | | | | |
| 9 | 2 | 0 to 2 | 1 | | | | |
| 10 | 2 | 0 to 3 | 1 | | | | |
| 11 | 2 | 0 and 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0 and 1 | 2 | | | | |
| 21 | 2 | 2 and 3 | 2 | | | | |
| 22 | 2 | 4 and 5 | 2 | | | | |
| 23 | 2 | 6 and 7 | 2 | | | | |
| 24 | 2 | 0 and 4 | 2 | | | | |
| 25 | 2 | 2 and 6 | 2 | | | | |
| 26 | 2 | 0, 1, and 4 | 2 | | | | |
| 27 | 2 | 2, 3, and 6 | 2 | | | | |
| 28 | 2 | 0,1,4, and 5 | | | | | |

TABLE 4-continued

| | One codeword: Codeword 0 means enabled, and codeword 1 means disabled | | | Two codewords: Codeword 0 means enabled, and codeword 1 means enabled | | |
|---|---|---|---|---|---|---|
| Value | Quantity of DMRS CDM groups without data | DMRS port | Quantity of front-load symbols | Value | Quantity of DMRS CDM groups without data | DMRS port | Quantity of front-load symbols |
| 29 | 2 | 2, 3, 6, and 7 | 2 | | | | |
| 30 | 2 | 0, 2, 4, and 6 | 2 | | | | |
| 31 | Reserved | Reserved | Reserved | | | | |

Table 4 shows eight PDSCH DMRS ports (that is, ports 0 to 7) supported by the terminal device when a DMRS type is 1 and a maximum length (maxLength) is 2. A value of a DMRS port is an abbreviation. To be specific, "0" indicates 1000 and "1" indicates 1001. Table 4 includes 32 indexes, that is, values 0 to 31, which means that a size of an Antenna port(s) field is five bits.

When Table 4 is configured for the terminal device 120 by the network device 110 (that is, in a case in which a network device can use at most two codewords to send a PDSCH), the network device 110 and the terminal device 120 determine, depending on whether a quantity of codewords currently actually used is one codeword or two codewords, which part in Table 4 is to be used. When the network device 110 and the terminal device 120 use one codeword for transmission, content on the left of Table 4 is used. When the network device 110 and the terminal device 120 use two codewords for transmission, content on the right of Table 4 is used.

The following further provides examples of two DMRS port configurations.

TABLE 5

| | One codeword: Codeword 0 means enabled, and codeword 1 means disabled | | | Two codewords: Codeword 0 means enabled, and codeword 1 means enabled | | |
|---|---|---|---|---|---|---|
| Value | Quantity of DMRS CDM groups without data | DMRS port | Value | Quantity of DMRS CDM groups without data | DMRS port |
| 0 | 1 | 0 | 0 | 3 | 0 to 4 |
| 1 | 1 | 1 | 1 | 3 | 0 to 5 |
| 2 | 1 | 0 and 1 | 2 to 31 | Reserved | Reserved |

TABLE 5-continued

| | One codeword: Codeword 0 means enabled, and codeword 1 means disabled | | | Two codewords: Codeword 0 means enabled, and codeword 1 means enabled | | |
|---|---|---|---|---|---|---|
| Value | Quantity of DMRS CDM groups without data | DMRS port | Value | Quantity of DMRS CDM groups without data | DMRS port |
| 3 | 2 | 0 | | | |
| 4 | 2 | 1 | | | |
| 5 | 2 | 2 | | | |
| 6 | 2 | 3 | | | |
| 7 | 2 | 0 and 1 | | | |
| 8 | 2 | 2 and 3 | | | |
| 9 | 2 | 0 to 2 | | | |
| 10 | 2 | 0 to 3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0 and 1 | | | |
| 18 | 3 | 2 and 3 | | | |
| 19 | 3 | 4 and 5 | | | |
| 20 | 3 | 0 to 2 | | | |
| 21 | 3 | 3 to 5 | | | |
| 22 | 3 | 0 to 3 | | | |
| 23 | 2 | 0 and 2 | | | |
| 24 to 31 | Reserved | Reserved | | | |

Table 5 shows six PDSCH DMRS ports (that is, ports 0 to 5 shown in the third column) supported by the terminal device when dmrs-Type is 2 and maxLength is 1. A value of a DMRS port is an abbreviation. To be specific, "0" indicates 1000 and "1" indicates 1001. Meanings of parameters in Table 5 are the same as meanings of the corresponding parameters in Table 3 and Table 4.

TABLE 6

| | One codeword: Codeword 0 means enabled, and codeword 1 means disabled | | | Two codewords: Codeword 0 means enabled, and codeword 1 means enabled | | |
|---|---|---|---|---|---|---|
| Value | Quantity of DMRS CDM groups without data | DMRS port | Quantity of front-load symbols | Value | Quantity of DMRS CDM groups without data | DMRS port | Quantity of front-load symbols |
| 0 | 1 | 0 | 1 | 0 | 3 | 0 to 4 | 1 |
| 1 | 1 | 1 | 1 | 1 | 3 | 0 to 5 | 1 |
| 2 | 1 | 0 and 1 | 1 | 2 | 2 | 0, 1, 2, 3, and 6 | 2 |
| 3 | 2 | 0 | 1 | 3 | 2 | 0, 1, 2, 3, 6, and 8 | 2 |

TABLE 6-continued

| | One codeword: Codeword 0 means enabled, and codeword 1 means disabled | | | | Two codewords: Codeword 0 means enabled, and codeword 1 means enabled | | |
| --- | --- | --- | --- | --- | --- | --- | --- |
| Value | Quantity of DMRS CDM groups without data | DMRS port | Quantity of front-load symbols | Value | Quantity of DMRS CDM groups without data | DMRS port | Quantity of front-load symbols |
| 4 | 2 | 1 | 1 | 4 | 2 | 0, 1, 2, 3, 6, 7, and 8 | 2 |
| 5 | 2 | 2 | 1 | 5 | 2 | 0, 1, 2, 3, 6, 7, 8, and 9 | 2 |
| 6 | 2 | 3 | 1 | 6 to 63 | Reserved | Reserved | Reserved |
| 7 | 2 | 0 and 1 | 1 | | | | |
| 8 | 2 | 2 and 3 | 1 | | | | |
| 9 | 2 | 0 to 2 | 1 | | | | |
| 10 | 2 | 0 to 3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0 and 1 | 1 | | | | |
| 18 | 3 | 2 and 3 | 1 | | | | |
| 19 | 3 | 4 and 5 | 1 | | | | |
| 20 | 3 | 0 to 2 | 1 | | | | |
| 21 | 3 | 3 to 5 | 1 | | | | |
| 22 | 3 | 0 to 3 | 1 | | | | |
| 23 | 2 | 0 and 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0 and 1 | 2 | | | | |
| 37 | 3 | 2 and 3 | 2 | | | | |
| 38 | 3 | 4 and 5 | 2 | | | | |
| 39 | 3 | 6 and 7 | 2 | | | | |
| 40 | 3 | 8 and 9 | 2 | | | | |
| 41 | 3 | 10 and 11 | 2 | | | | |
| 42 | 3 | 0, 1, and 6 | 2 | | | | |
| 43 | 3 | 2, 3, and 8 | 2 | | | | |
| 44 | 3 | 4, 5, and 10 | 2 | | | | |
| 45 | 3 | 0, 1, 6, and 7 | 2 | | | | |
| 46 | 3 | 2, 3, 8, and 9 | 2 | | | | |
| 47 | 3 | 4, 5, 10, and 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0 and 1 | 2 | | | | |
| 53 | 1 | 6 and 7 | 2 | | | | |
| 54 | 2 | 0 and 1 | 2 | | | | |
| 55 | 2 | 2 and 3 | 2 | | | | |
| 56 | 2 | 6 and 7 | 2 | | | | |
| 57 | 2 | 8 and 9 | 2 | | | | |
| 58 to 63 | Reserved | Reserved | Reserved | | | | |

Table 6 shows 12 PDSCH DMRS ports (that is, ports 0 to 11 shown in the third column) supported by the terminal device when a dmrs-Type is 2 and a maxLength is 2. A value of a DMRS port is an abbreviation. To be specific, "0" indicates 1000 and "1" indicates 1001. Meanings of parameters in Table 6 are the same as meanings of the corresponding parameters in Table 3 and Table 4.

FIG. 2 shows a channel information sending method 200 according to this application, and the method 200 may be performed by the terminal device 120. For brevity, the following "terminal device" and "network device" are not attached with reference drawing signs.

As shown in FIG. 2, the method 200 includes the following steps.

S210: Receive configuration information from the network device, where the configuration information is used to configure Q DMRS ports used for measurement, and Q is a positive integer.

A DMRS port is an antenna port carrying a DMRS. The antenna port is a logical port instead of a physical antenna, and corresponds to a group of time-frequency resources. On this group of resources, channel features (for example, large-scale channel features) of signals sent by using this group of resources are the same or can be mutually deduced. Therefore, regardless of whether these signals are sent by using a same physical antenna, when demodulating these signals, a receive end (for example, the terminal device in this application) may consider that the channel features of these signals are the same or can be mutually deduced. Based on this definition, the receive end may measure a DMRS on an antenna port to obtain downlink data on the antenna port.

The network device may configure the Q DMRS ports used for measurement in following configuration manners. The following several configuration manners are merely examples for description, and are not intended to limit a method for configuring, by the network device, the Q DMRS ports used for measurement.

For example, the network device may configure, for the terminal device by using a combination of higher-layer parameters dmrs-Type and maxLength, the DMRS ports used for measurement. The network device may send higher-layer parameters "dmrs-Type=1, and maxLength=1" to the terminal device, and the terminal device determines that the currently configured Q DMRS ports used for measurement are {1000, 1001, 1002, 1003}. That is, Q is equal to 4. The network device may alternatively send high-layer parameters "dmrs-Type=1, and maxLength=2" to the terminal device, and the terminal device determines that the currently configured Q DMRS ports used for measurement are {1000, 1001, 1002, 1003, 1004, 1005, 1006, 1007}. That is, Q is equal to 8.

For another example, the network device may configure, for the terminal device only by using a higher-layer parameter dmrs-Type, the DMRS ports used for measurement. The network device may configure the Q DMRS ports used for measurement by using PDSCH DMRS configuration type=1, that is, {1000, 1001, 1002, 1003, 1004, 1005, 1006, 1007}. That is, Q is equal to 8. The network device may alternatively configure the Q DMRS ports used for measurement by using PDSCH DMRS configuration type=2, that is, {1000, 1001, 1002, 1003, 1004, 1005, 1006, 1007, 1008, 1009, 1010, 1011}. That is, Q is equal to 12.

The network device may alternatively configure, for the terminal device by using new signaling, the Q DMRS ports used for measurement.

It should be noted that the terminal device does not necessarily measure all of the Q DMRS ports, and the terminal device may select Q1 DMRS ports from the Q DMRS ports according to a preset rule or based on an indication of the network device.

The Q1 DMRS ports selected by the terminal device may include M DMRS ports that carry downlink data. The network device may indicate the M DMRS ports by using DCI.

The terminal device may perform S220 to determine the M DMRS ports that carry the downlink data.

S220: Receive indication information from the network device, where the indication information is used to indicate the M DMRS ports, in the Q DMRS ports used for measurement that carry the downlink data, M is a positive integer, and Q is greater than M.

A DMRS port that carries the downlink data is an antenna port carrying a DMRS and the downlink data. Because both the DMRS and a PDSCH are on the antenna port, the antenna port is also referred to as a PDSCH DMRS port. A quantity M of the DMRS ports that carry the downlink data is usually less than or equal to a quantity of PDSCH DMRS ports supported by the terminal device. The indication information is, for example, DCI, and the network device may use the Antenna port(s) field in the DCI to indicate the DMRS ports that carry the downlink data.

For example, if the network device indicates the terminal device to use Table 3, the network device may use four bits in the DCI to indicate the M DMRS ports that currently carry the downlink data to the terminal device. If the network device indicates the terminal device to use Table 4, the network device may further use five bits in the DCI to indicate the M DMRS ports that currently carry the downlink data to the terminal device.

The terminal device may determine, based on code division multiplexing (code division multiplexing, CDM) groups of the M DMRS ports that carry the downlink data, DMRS ports ("other DMRS ports" for short below) other than the M DMRS ports that carry the downlink data in the Q DMRS ports used for measurement.

Option 1: The network device determines the other DMRS ports based on an antenna port indicator field in the DCI. A CDM group (that is, a DMRS CDM group without data) that corresponds to a PDSCH DMRS port and that is configured in the antenna port indicator field in the DCI is shown in Table 1. Table 1 is merely an example for description, and the CDM group corresponding to the PDSCH DMRS port is not limited thereto.

When the antenna port indicator field in the DCI is the value "0" in Table 3, the terminal device may determine, according to a communication protocol that a quantity of DMRS CDM groups without data is 1, that is, the CDM group 0 in Table 1. The DMRS port that carries the downlink data is 1000.

It can be learned from Table 1 that DMRS ports corresponding to the CDM group 0 are 1000, 1001, 1004, and 1005, the four DMRS ports are candidate DMRS ports that the network device indicates the terminal device to measure this time, 1000 is the DMRS port that carries the downlink data, and 1001, 1004, and 1005 are the other DMRS ports. Because CDM groups corresponding to the other DMRS ports are the same as the CDM group corresponding to the DMRS port that carries the downlink data, when a protocol presets a rule or the network device sets to measure another DMRS port corresponding to a CDM group different from the CDM group 0 (that is, the CDM group corresponding to the DMRS port that carries the downlink data), the terminal device may measure only the DMRS port that carries the downlink data, that is, measure 1000. That is, Q1 is equal to 1. When a protocol presets a rule or the network device does not limit a type of a DMRS port to be measured by the terminal device, the terminal device may measure 1000, 1001, 1004, and 1005. That is, Q1 is equal to 4. Further, if a value of Q1 is configured by the network device, for example, Q1=2, the terminal device may measure the DMRS port that carries the downlink data and one of the other DMRS ports, for example, measure 1000 and 1004.

When the antenna port indicator field in the DCI is the value "3" in Table 3, the terminal device may determine, according to the communication protocol that a quantity of DMRS CDM groups without data is 2, that is, the CDM group 0 and the CDM group 1 in Table 1. The DMRS port that carries the downlink data is 1000.

It can be learned from Table 1 that DMRS ports corresponding to the CDM group 0 are 1000, 1001, 1004, and 1005, DMRS ports corresponding to the CDM group 1 are 1002, 1003, 1006, and 1007, the eight DMRS ports are candidate DMRS ports that the network device indicates the terminal device to measure this time, 1000 is the DMRS port that carries the downlink data, and 1001, 1002, 1003, 1004, 1005, 1006, and 1007 are the other DMRS ports. When a protocol presets a rule or the network device sets to measure another DMRS port corresponding to a CDM group different from the CDM group 0 (that is, the CDM group corresponding to the DMRS port that carries the downlink data), the terminal device may measure the DMRS port that carries the downlink data and other DMRS ports corresponding to the CDM group 1, for example, measure 1000, 1002, 1003, 1006, and 1007. That is, Q1 is equal to 5. Further, if a value of Q1 is configured by a network device, for example, Q1=4, the terminal device may measure the DMRS port that carries the downlink data and three of the other DMRS ports corresponding to the CDM group 1, for example, measure 1000, 1003, 1006, and 1007. When a protocol presets a rule or the network device does not limit a type of a DMRS port to be measured by the terminal device, the terminal may measure 1000 to 1007. That is, Q1 is equal to 8. Further, if a value of Q1 is configured by a network, for example, Q1=4, the terminal device may measure the DMRS port that carries the downlink data and three of the other DMRS ports, for example, measure 1000, 1001, 1006, and 1007.

Option 2: The terminal device determines the other DMRS ports based on the higher-layer parameter (dmrs-Type) and an antenna port indicator field in the DCI. A difference between the option 2 and the option 1 lies in that, in a solution of the option 2, the DMRS ports used for measurement is semi-statically configured by using the higher-layer parameter (dmrs-Type), and the DCI is used only to indicate the DMRS ports that carry the downlink data, but in a solution of the option 1, the DMRS ports used for measurement and the DMRS ports that carry the downlink data are dynamically indicated each time by using the DCI.

When the higher-layer parameter (dmrs-Type) is 1, the DMRS ports configured by the network device and used for measurement are all the DMRS ports shown in Table 1, where the ports 1000, 1001, 1004, and 1005 belong to the CDM group 0, and the ports 1002, 1003, 1006, and 1007 belong to the CDM group 1.

When the antenna port indicator field in the DCI is the value "0" in Table 3, the terminal device may determine, according to the communication protocol that a quantity of DMRS CDM groups without data is 1, that is, the CDM group 0 in Table 1. The DMRS port that carries the downlink data is 1000. Therefore, when a protocol presets a rule or the network device indicates to measure another DMRS port corresponding to a CDM group different from the CDM group 0 (that is, the CDM group corresponding to the DMRS port that carries the downlink data), the terminal device may measure only the DMRS port that carries the downlink data and DMRS ports in the CDM group 1, that is, measure 1000, 1002, 1003, 1006, and 1007. That is, Q1 is equal to 5. Further, if a value of Q1 is configured by a network, for example, Q1=4, the terminal device may measure the DMRS port that carries the downlink data and three of other DMRS ports corresponding to the CDM group 1, for example, measure 1000, 1003, 1006, and 1007. When a protocol presets a rule or the network device does not limit a type of a DMRS port to be measured by the terminal device, the terminal device may measure all DMRS ports in the CDM group 0 and the CDM group 1, that is, measure 1000 to 1007. That is, Q1 is equal to 8. Further, if a value of Q1 is configured by a network, for example, Q1=4, the terminal device may measure the DMRS port that carries the downlink data and three of the other DMRS ports, for example, measure 1000 to 1003.

For another example, when the higher-layer parameter (dmrs-Type) is 2, according to Table 2, the DMRS ports used for measurement are 1000 to 1011, where the ports 1000, 1001, 1006, and 1007 belong to the CDM group 0, the ports 1002, 1003, 1008, and 1009 belong to the CDM group 1, and the ports 1004, 1005, 1010, and 1011 belong to the CDM group 2.

When the antenna port indicator field in the DCI is the value "0" in Table 5, the terminal device may determine, according to the communication protocol that a quantity of DMRS CDM groups without data is 1, that is, the CDM group 0 in Table 2. The DMRS port that carries the downlink data is 1000. Therefore, when a protocol presets a rule or the network device indicates to measure another DMRS port corresponding to a CDM group different from the CDM group 0 (that is, the CDM group corresponding to the DMRS port that carries the downlink data), the terminal device may measure only the DMRS port that carries the downlink data and DMRS ports in the CDM group 1 and the CDM group 2, that is, measure 1000, 1002, 1003, 1008, 1009, 1004, 1005, 1010 and 1011. That is, Q1 is equal to 9. Further, if a value of Q1 is configured by a network, for example, Q1=4, the terminal device may measure the DMRS port that carries the downlink data and three of other DMRS ports corresponding to the CDM group 1 and the CDM group 2, for example, measure 1000, 1003, 1006, and 1007. When a protocol presets a rule or the network device does not limit a type of a DMRS port to be measured by the terminal device, the terminal device may measure all DMRS ports in the CDM group 0, the CDM group 1, and the CDM group 2, that is, measure 1000 to 1011. That is, Q1 is equal to 12. Further, if a value of Q1 is configured by a network, for example, Q1=4, the terminal device may measure the DMRS port that carries the downlink data and three of the other DMRS ports, for example, measure 1000 to 1003.

When Q1 is equal to Q, the terminal device measures all the DMRS ports that are configured by the network device and that can be used for measurement.

The foregoing describes in detail how the network device configures the DMRS ports used for measurement and how the terminal device determines the DMRS ports used for measurement. For a specific method for measuring the DMRS ports by the terminal device, refer to a method for measuring a DMRS port in a current technology. For brevity, details are not described herein again.

After measuring the DMRS ports, the terminal device may perform S220 to report channel information to the network device.

S230: Send channel information of P DMRS ports to the network device, where DMRS ports included in the P DMRS ports belong to the Q DMRS ports used for measurement, and P is a positive integer.

A specific value of P may be indicated in the DCI or configured by using radio resource control (RRC) signaling, or may be preset in the communication protocol. The P DMRS ports finally reported by the terminal device may include the M DMRS ports that carry the downlink data, or may not include the M DMRS ports that carry the downlink data. For example, when channel quality of the M DMRS ports that carry the downlink data is relatively poor, the terminal device may not report the M DMRS ports that carry the downlink data.

Because a quantity Q of the DMRS ports measured by the terminal device is greater than a quantity M of the DMRS ports that carry the downlink data, if the channel quality of the M DMRS ports that carry the downlink data is relatively poor, and channel quality of a DMRS port that does not carry the downlink data in the Q DMRS ports is relatively good, the terminal device may report a number of the DMRS port that does not carry the downlink data, so that the network device transmits the downlink data by using the DMRS port of better channel quality. Therefore, compared with a solution in the current technology in which only the M DMRS ports that carry the downlink data are measured, the method provided in this application increases a quantity of candidate DMRS ports, so that the network device has a higher probability of selecting a DMRS port of relatively good channel quality (for example, a DMRS port corresponding to a beam in a specific direction) for communication.

In addition to reporting channel information of each DMRS port, the terminal device may also report the channel information to the network device in a form of a port group. To be specific, the terminal device groups, based on M, the Q DMRS ports used for measurement to obtain X DMRS port groups, where a quantity of DMRS ports included in each DMRS port group is M. P1 DMRS port groups that are finally reported are all or some of the X DMRS port groups. A specific value of P1 may be configured by using the DCI or higher layer signaling (for example, RRC signaling), and whether signal information is reported in a form of a port or the channel information is reported in a form of a port group may be configured by using the DCI or the higher layer signaling, or may be specified in a protocol.

Optionally, a quantity of ports in each DMRS port group may not be equal to M, but may be another value configured by the network device or another value specified in the communication protocol.

The network device may indicate the terminal device to report DMRS ports or DMRS port groups corresponding to different CDM groups, or it may be specified in a protocol that the terminal device reports DMRS ports or DMRS port groups corresponding to different CDM groups.

For example, the P1 DMRS port groups reported by the terminal device include a first DMRS port group and a second DMRS port group, and the first DMRS port group and the second DMRS port group correspond to different CDM groups.

Because the DMRS ports measured by the terminal device include a DMRS port that does not carry the downlink data, when channel quality of the DMRS port that carries the downlink data is relatively poor, the network device may select a DMRS port that does not carry the downlink data and that has relatively good channel quality to transmit the downlink data. Therefore, according to the method 200, communication quality deterioration caused by the relatively poor channel quality of the DMRS port that carries downlink data can be avoided.

Compared with a method of measuring channel quality by using a CSI-RS, according to the method 200, existing RRC signaling may be reused when the DMRS ports that carry the downlink data are measured, and no additional RRC signaling is needed to configure a time-frequency resource required for channel measurement. In addition, when the terminal device measures another DMRS port that corresponds to a same CDM group as that of the DMRS ports that carry the downlink data, no additional time-frequency resource needs to be occupied. When the terminal device measures another DMRS port that corresponds to a different CDM group from that of the DMRS ports that carry the downlink data, only a small quantity of time-frequency resources are occupied. This is also an advantage of the method 200 compared with the current technology.

In an optional example, it may be specified in a protocol or the network device may indicate the terminal device to report channel information of the P DMRS ports of best channel quality or the P1 DMRS port groups of best channel quality, and the P1 DMRS port groups are P1 DMRS port groups of best channel quality among the X DMRS port groups.

That channel quality of the P1 DMRS port groups is the best can be explained as follows: A CQI value of each DMRS group among the P1 DMRS port groups is greater than a preset threshold, or a channel capacity of each DMRS group is greater than a threshold.

For example, the network device configures eight DMRS ports, that is, {1000, 1001, 1002, 1003, 1004, 1005, 1006, 1007}, where 1000 and 1001 are two DMRS ports that carry the downlink data, and the two DMRS ports are used as one DMRS port group. The network device further indicates that a quantity of the DMRS ports used for measurement is 6. Therefore, the terminal device may choose to measure the following three groups of DMRS ports: {1000, 1001}, {1002, 1003}, and {1004, 1005}. Channel quality of the DMRS port group {1000, 1001} is the poorest, channel quality of the DMRS port group {1002, 1003} is relatively poor, and channel quality of the DMRS port group {1004, 1005} is the best, so two DMRS port groups reported by the terminal device are {1002, 1003} and {1004, 1005}.

In another optional example, it may be specified in a protocol or the network device may indicate the terminal device to report channel information of the DMRS ports that carry the downlink data, that is, regardless of the channel quality of the DMRS ports that carry the downlink data, the channel information of the DMRS ports that carry the downlink data needs to be reported; or reports channel information of a port group corresponding to the DMRS ports that carry the downlink data. In other words, the P1 DMRS port groups reported by the terminal device include one DMRS port group to which the M DMRS ports that carry the downlink data belong and P1-1 DMRS port groups of best channel quality among DMRS port groups to which the other DMRS ports belong.

For example, the network device configures eight DMRS ports, that is, {1000, 1001, 1002, 1003, 1004, 1005, 1006, 1007}, where the eight DMRS ports are all DMRS ports used for measurement, 1000 and 1001 are two DMRS ports that carry the downlink data, {1000, 1001} is one DMRS port group, and the rest six DMRS ports are grouped into three DMRS port groups. For brevity, the following uses a port number to represent channel quality of a port.

Channel quality of the foregoing four DMRS port groups is as follows: {1006, 1007}>{1002, 1003}>{1004, 1005}>{1000, 1001}, where channel quality of the DMRS port group {1000, 1001} is the poorest, and channel quality of the DMRS port group {1006, 1007} is the best, so three DMRS port groups reported by the terminal device are {1000, 10011, 11006, 1007}, and {1002, 1003}.

For another example, the network device configures eight DMRS ports, that is, {1000, 1001, 1002, 1003, 1004, 1005, 1006, 1007}, where the eight DMRS ports are all DMRS ports used for measurement, 1000 is the DMRS port that carries the downlink data, and the eight DMRS ports are grouped into eight DMRS port groups, that is, each DMRS port group includes one DMRS port.

A channel measurement result of the foregoing eight DMRS port groups is: {1006}>{1007}>{1002}>{1003}>{1004}>{1005}>{1000}>{1001}, where channel quality of the DMRS port group {1001} is the poorest, and channel quality of the DMRS port group {1006} is the best, so four DMRS port groups reported by the terminal device are {1006}, {1007}, {1002}, and {1000}.

In another optional example, it may be specified in a protocol or a network may indicate the terminal device to report channel information of a DMRS port or a DMRS port group whose channel quality reaches a threshold, and the threshold may be an absolute threshold specified in the protocol or configured by the network, or may be a relative threshold specified in the protocol or configured by the network. For example, for the DMRS ports measured by the terminal device, when channel quality of the DMRS ports exceeds the absolute threshold, or channel quality of the DMRS ports exceeds the channel quality of the DMRS ports that carry the data and reaches the relative threshold, the terminal device reports channel information of these DMRS ports. If there is no DMRS port or DMRS port group that meets a requirement, the terminal device reports only channel information of the DMRS ports or the DMRS port groups that carry the downlink data.

Because a frequency domain resource occupied by a DMRS port is configured by the network device for the terminal device before a downlink data transmission, the frequency domain resource is known to both the terminal device and the network device during the downlink data transmission. Therefore, the channel information reported by the terminal device may include only numbers of the P DMRS ports or numbers of the P1 DMRS port groups, thereby having an advantage of reporting a relatively small amount of data. Optionally, the terminal device may further report modulation and coding scheme (MCS) information of the P DMRS ports or the P1 DMRS port groups, that is, indicate a variation value of an MCS format used in a next downlink data transmission, or indicate an index of an MCS format used for a next downlink data transmission. In addition, the channel information may further include some or all types of CSI in the current technology, to provide more detailed data for the network device to determine a better downlink channel. For example, the channel information may further include at least one of a channel quality indicator (CQI), a precoding matrix indicator (PMI), a CSI-RS resource indicator (CRI), an SSB resource indicator (SSBRI), a rank indicator (RI), and a layer-1 reference signal received power (L1-RSRP) that are of the P1 DMRS port groups.

The foregoing mainly describes the channel information sending method provided in this application from a perspective of the terminal device. There is a correspondence between a processing process of the network device and that of the terminal device. For example, that the terminal device receives the information from the network device means that the network device sends the information. That the terminal device sends the information to the network device means that the network device receives the information from the terminal device. Therefore, even if the processing process of the network device is not clearly described in some parts above, a person skilled in the art may clearly understand the processing process of the network device based on the processing process of the terminal device.

The foregoing describes in detail examples of the channel information sending method and a channel information receiving method that are provided in this application. It may be understood that, to implement the foregoing functions, a communication apparatus includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the communication apparatus may be divided into functional units based on the foregoing method example. For example, each functional unit may be obtained through division based on a corresponding function, or two or more functions may be integrated into one processing unit. The integrated unit may be implemented in a form of hardware, or may be implemented in a form of a software functional unit. It should be noted that, division into units in this application is an example, and is merely logical function division. During actual implementation, another division manner may be used.

Figure 3:
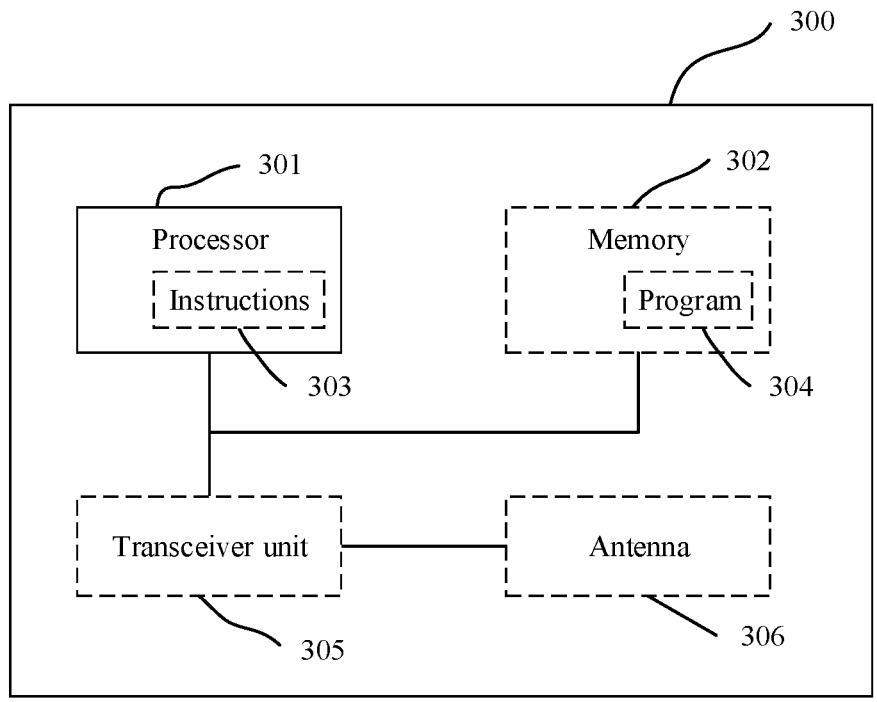
FIG. 3 is a schematic structural diagram of a communication apparatus according to this application.

FIG. 3 is a schematic structural diagram of a communication apparatus according to this application. The communication apparatus 300 may be configured to implement the method described in the foregoing method embodiment. The communication apparatus 300 may be a chip, a network device, or a terminal device.

The communication apparatus 300 includes one or more processors 301. The one or more processors 301 may support the communication apparatus 300 in implementing the method in the method embodiment shown in FIG. 2. The processor 301 may be a general-purpose processor or a dedicated processor. For example, the processor 301 may be a central processing unit (CPU) or a baseband processor. The baseband processor may be configured to process communication data (for example, the configuration information described above). The CPU may be configured to: control the communication apparatus (for example, a network device, a terminal device, or a chip), execute a software program, and process data of the software program. The communication apparatus 300 may further include a transceiver unit 305 that is configured to input (receive) and output (send) a signal.

For example, the communication apparatus 300 may be a chip, and the transceiver unit 305 may be an input and/or output circuit of the chip. Alternatively, the transceiver unit 305 may be a communication interface of the chip, and the chip may be used as a component of a terminal device, a network device, or another wireless communication device.

The communication apparatus 300 may include one or more memories 302. The memory 302 stores a program 304, and the program 304 may be run by the processor 301 to generate instructions 303, so that the processor 301 performs, based on the instructions 303, the method described in the foregoing method embodiment. Optionally, the memory 302 may further store data. Optionally, the processor 301 may further read the data (for example, Table 1 to Table 6) stored in the memory 302. The data and the program 304 may be stored at a same storage address, or the data and the program 304 may be stored at different storage addresses.

The processor 301 and the memory 302 may be disposed separately, or may be integrated together, for example, integrated on a board or integrated into a system on chip (SOC).

The communication apparatus 300 may further include the transceiver unit 305 and an antenna 306. The transceiver unit 305 may be referred to as a transceiver, a transceiver circuit, or a transceiver, and is configured to implement sending and receiving functions of the communication apparatus through the antenna 306.

In a possible design, the processor 301 is configured to send configuration information to a terminal device by using the transceiver unit 305 and the antenna 306, where the configuration information is used to configure Q DMRS ports used for measurement, the Q DMRS ports used for measurement include M DMRS ports that carry downlink data, Q is a positive integer, M is a positive integer, and Q is greater than M.

The processor 301 is further configured to receive channel information of P DMRS ports from the terminal device by using the transceiver unit 305 and the antenna 306, where the P DMRS ports belong to the Q DMRS ports used for measurement, and P is a positive integer.

For a specific manner of sending the configuration information and receiving the channel information, refer to related descriptions in the foregoing method embodiment.

In another possible design, the processor 301 is configured to receive configuration information from a network device by using the transceiver unit 305 and the antenna 306, where the configuration information is used to configure Q DMRS ports used for measurement, the Q DMRS ports used for measurement include M DMRS ports that carry downlink data, Q is a positive integer, M is a positive integer, and Q is greater than M.

The processor 301 is further configured to send channel information of P DMRS ports to the network device by using the transceiver unit 305 and the antenna 306, where the P DMRS ports belong to the Q DMRS ports used for measurement, and P is a positive integer.

For a specific manner of receiving the configuration information and sending the channel information, refer to related descriptions in the foregoing method embodiment.

It should be understood that steps in the foregoing method embodiment may be implemented by using a logic circuit in a form of hardware or instructions in a form of software in the processor 301. The processor 301 may be a CPU, a digital signal processor (DSP), an application-specific integrated circuit (ASIC), a field programmable gate array (FPGA) or another programmable logic device, for example, discrete gate, transistor logic device, or discrete hardware component.

This application further provides a computer program product. When the computer program product is executed by a processor 301, the communication method according to any one of the method embodiments of this application is implemented.

The computer program product may be stored in a memory 302. For example, the computer program product is a program 304. After processing processes such as preprocessing, compilation, assembly, and linking, the program 304 is finally converted into an executable target file that can be executed by the processor 301.

This application further provides a computer-readable storage medium. The computer-readable storage medium stores a computer program. When the computer program is executed by a computer, the communication method according to any one of the method embodiments of this application is implemented. The computer program may be a high-level language program, or may be an executable target program.

The computer-readable storage medium is, for example, a memory 302. The memory 302 may be a volatile memory or a nonvolatile memory, or the memory 302 may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM).

Figure 4:
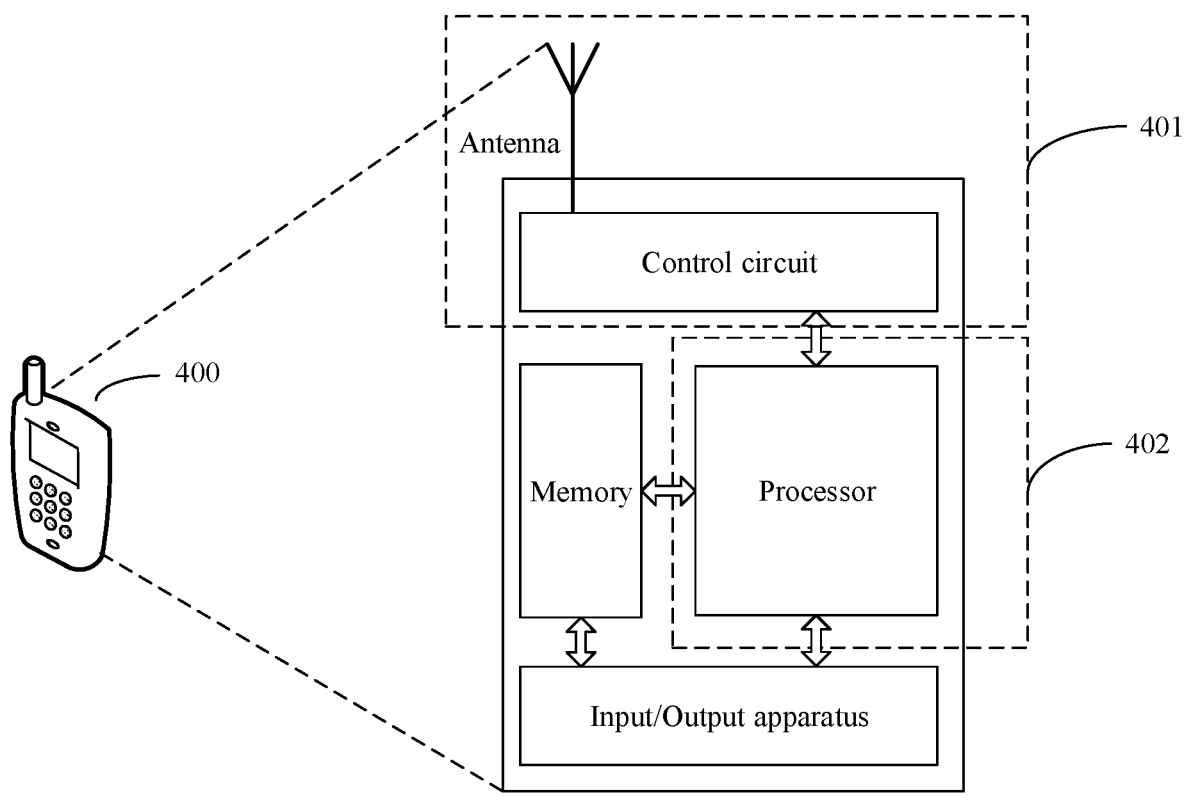
FIG. 4 is a schematic structural diagram of a terminal device according to this application.

When the communication apparatus 300 is a terminal device, FIG. 4 is a schematic structural diagram of a terminal device according to this application. The terminal device 400 may be used in the system shown in FIG. 1, and implements functions of the terminal device in the foregoing method embodiment. For ease of description, FIG. 4 shows only main components of the terminal device.

As shown in FIG. 4, the terminal device 400 includes a processor, a memory, a control circuit, an antenna, and an input/output apparatus. The processor is mainly configured to: process a communication protocol and communication data, and control the entire terminal device. For example, the processor receives configuration information by using the antenna and the control circuit, generates first time information based on the configuration information, and then sends the first time information by using the control circuit and the antenna. The memory is mainly configured to store a program and data, for example, store the communication protocol and the foregoing configuration information. The control circuit is mainly configured to: perform conversion between a baseband signal and a radio frequency signal, and process the radio frequency signal. A combination of the control circuit and the antenna may also be referred to as a transceiver that is mainly configured to receive/send a radio frequency signal in an electromagnetic wave form. The input/output apparatus, such as a touchscreen or a keyboard, is mainly configured to: receive data input by a user, and output data to the user.

After the terminal device is powered on, the processor may read the program in the memory, interpret and execute instructions included in the program, and process data in the program. When information needs to be sent through the antenna, the processor performs baseband processing on the to-be-sent information, and outputs a baseband signal to a radio frequency circuit. The radio frequency circuit performs radio frequency processing on the baseband signal to obtain a radio frequency signal, and sends the radio frequency signal in an electromagnetic wave form through the antenna. When an electromagnetic wave (namely, the radio frequency signal) carrying the information arrives at the terminal device, the radio frequency circuit receives the radio frequency signal through the antenna, converts the radio frequency signal into the baseband signal, and outputs the baseband signal to the processor. The processor converts the baseband signal into the information, and processes the information.

A person skilled in the art may understand that for ease of description, FIG. 4 shows only one memory and only one processor. An actual terminal device may include a plurality of processors and a plurality of memories. The memory may also be referred to as a storage medium, a storage device, or the like. This is not limited in this application.

In an optional implementation, the processor in FIG. 4 may integrate functions of a baseband processor and a CPU. A person skilled in the art may understand that the baseband processor and the CPU may alternatively be independent processors, and are interconnected by using a technology such as a bus. A person skilled in the art may understand that the terminal device may include a plurality of baseband processors to adapt to different network standards, the terminal device may include a plurality of CPUs to improve a processing capability of the terminal device, and the components of the terminal device may be connected by using various buses. The baseband processor may also be referred to as a baseband processing circuit or a baseband processing chip. The CPU may also be referred to as a central processing circuit or a central processing chip. A function of processing the communication protocol and the communication data may be built in the processor, or may be stored in the memory in a form of a program, so that the processor executes the program in the memory to implement a baseband processing function.

In this application, the antenna and the control circuit that have sending and receiving functions may be considered as a transceiver unit 401 of the terminal device 400. The transceiver unit 401 is configured to support the terminal device in implementing the receiving function in the method embodiment, or is configured to support the terminal device in implementing the sending function in the method embodiment. The processor that has a processing function is considered as a processing unit 402 of the terminal device 400. As shown in FIG. 4, the terminal device 400 includes the transceiver unit 401 and the processing unit 402. The transceiver unit may also be referred to as a transceiver, a transceiver, a transceiver apparatus, or the like. Optionally, a device configured to implement a receiving function in the transceiver unit 401 may be considered as a receiving unit. A device configured to implement a sending function in the transceiver unit 401 may be considered as a sending unit. In other words, the transceiver unit 401 includes the receiving unit and the sending unit. The receiving unit may also be referred to as a receiving machine, an input port, a receiving circuit, or the like. The sending unit may be referred to as a transmitting machine, a transmitter, a transmitting circuit, or the like.

The processor 402 may be configured to execute the program stored in the memory, to control the transceiver unit 401 to receive a signal and/or send a signal, so as to complete a function of the terminal device in the foregoing method embodiment. In an implementation, a function of the transceiver unit 401 may be implemented by using a transceiver circuit or a transceiver-dedicated chip.

Figure 5:
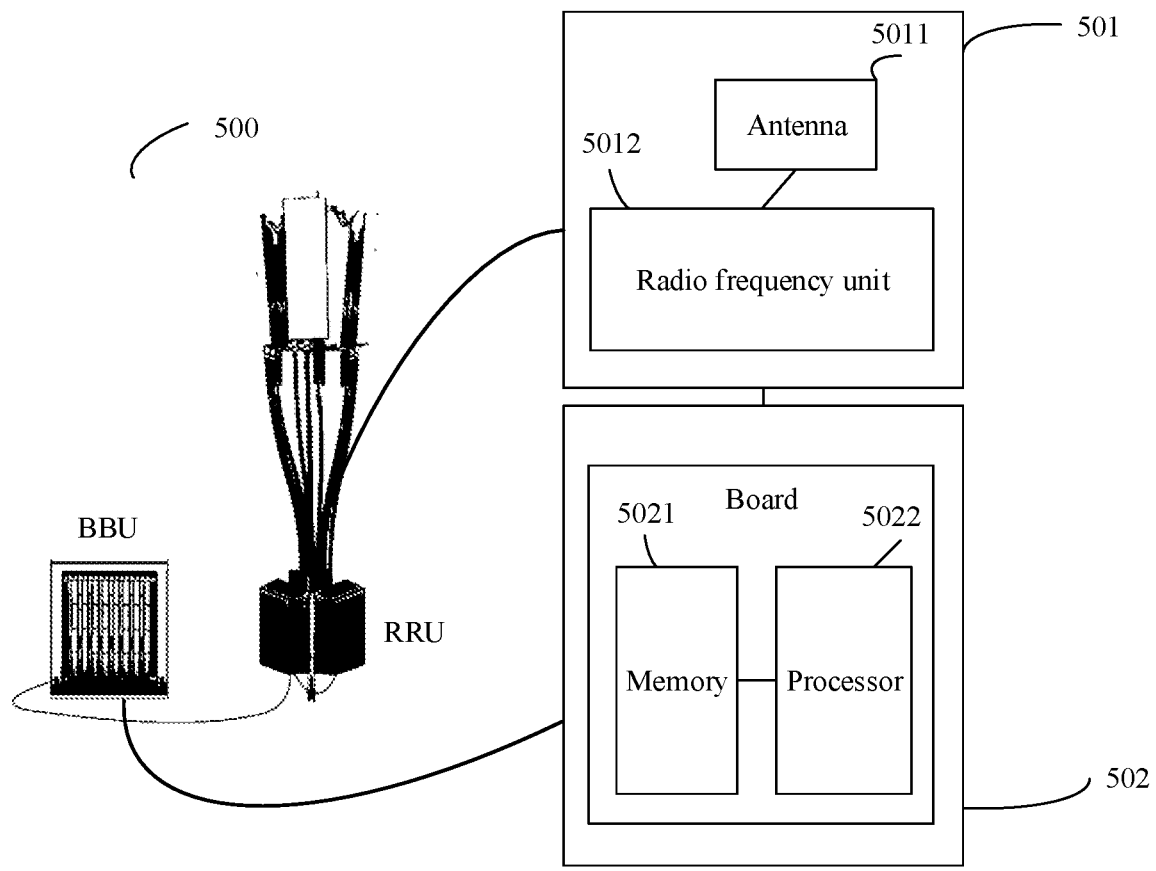
FIG. 5 is a schematic structural diagram of a network device according to this application.

When the communication apparatus 300 is a network device, FIG. 5 is a schematic structural diagram of a network device according to this application. The network device may be, for example, a base station. As shown in FIG. 5, the base station may be used in the system shown in FIG. 1, to implement a function of the network device in the foregoing method embodiment. The base station 500 may include one or more radio frequency units, for example, a remote radio unit (remote radio unit, RRU) 501 and at least one baseband unit (BBU) 502. The BBU 502 may include a distributed unit (DU), or may include a DU and a centralized unit (CU).

The RRU 501 may be referred to as a transceiver unit, a transceiver, a transceiver circuit, or a transceiver, and may include at least one antenna 5011 and a radio frequency unit 5012. The RRU 501 is mainly configured to perform receiving and sending of a radio frequency signal and conversion between a baseband signal and a radio frequency signal, for example, configured to support the base station in implementing a sending function and a receiving function in the method embodiment. The BBU 502 is mainly configured to: perform baseband processing, control the base station, and the like. The RRU 501 and the BBU 502 may be physically disposed together, or may be physically separated, namely, a distributed base station.

The BBU 502 may also be referred to as a processing unit, and is mainly configured to complete a baseband processing function, such as channel coding, multiplexing, modulation, or spreading. For example, the BBU 502 may be configured to control the base station to perform an operation procedure related to the network device in the foregoing method embodiment.

The BBU 502 may include one or more boards. A plurality of boards may jointly support a radio access network (for example, a long term evolution (LTE) network) of a single access standard, or may separately support radio access networks (for example, an LTE network and a 5G network) of different access standards. The BBU 502 further includes a memory 5021 and a processor 5022. The memory 5021 is configured to store necessary instructions and necessary data. For example, the memory 5021 stores various types of instruction information in the foregoing method embodiment. The processor 5022 is configured to control the base station to perform a necessary action, for example, is configured to control the base station to perform the operation procedure in the foregoing method embodiment. The memory 5021 and the processor 5022 may serve one or more boards. In other words, a memory and a processor may be independently disposed on each board, or a plurality of boards may share a same memory and a same processor. In addition, a necessary circuit may be further disposed on each board.

It may be clearly understood by a person skilled in the art that, for the purpose of convenient and brief description, for a specific working process of the foregoing system, apparatus and unit, refer to a corresponding process in the foregoing method embodiment. Details are not described herein again.

In the several embodiments provided in this application, the disclosed system, apparatus and method may be implemented in other manners. For example, some features of the method embodiment described above may be ignored or not performed. The described apparatus embodiment is merely an example. The division into units is merely logical function division and there may be another division during actual implementation. A plurality of units or components may be combined or integrated into another system. In addition, a coupling between the units or a coupling between the components may be a direct coupling, or may be an indirect coupling. The foregoing coupling includes an electrical connection, a mechanical connection, or a connection in another form.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the terms "system" and "network" may be used interchangeably in this specification. The term "and/or" in this specification is merely an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

In summary, what is described above is merely example embodiments of the technical solutions of this application, but is not intended to limit the protection scope of this application. Any modification, equivalent replacement, or improvement made without departing from the principle of this application shall fall within the protection scope of this application.

What is claimed is:

1. A channel information sending method, comprising:
receiving configuration information from a network device, wherein the configuration information identifies Q demodulation reference signal (DMRS) ports used for measurement, and Q is a positive integer;
receiving indication information from the network device, wherein the indication information indicates M DMRS ports, in the Q DMRS ports used for measurement, that carry downlink data, M is a positive integer, and Q is greater than M; and
sending channel information of P DMRS ports to the network device, wherein the P DMRS ports belong to the Q DMRS ports used for measurement, and P is a positive integer, and wherein the P DMRS ports belong to P1 DMRS port groups, and a quantity of DMRS ports comprised in each of the P1 DMRS port groups is M, and P1 is a positive integer, wherein the P1 DMRS port groups comprise one DMRS port group to which the M DMRS ports that carry the downlink data belong and P1-1 DMRS port groups of best channel quality among DMRS port groups to which other DMRS ports belong, wherein the other DMRS ports are DMRS ports other than the M DMRS ports that carry the downlink data in the Q DMRS ports used for measurement.

2. The method according to claim 1, wherein the P1 DMRS port groups comprise a first DMRS port group and a second DMRS port group, and the first DMRS port group and the second DMRS port group correspond to different code division multiplexing (CDM) groups.

3. The method according to claim 1, wherein the channel information comprises numbers of the P1 DMRS port groups.

4. The method according to claim 3, wherein the channel information further comprises a channel quality indicator (CQI) of the P1 DMRS port groups, modulation and coding scheme (MCS) information of the P1 DMRS port groups, or a combination of the CQI and the MCS information.

5. An apparatus, comprising:
at least one processor; and one or more memories coupled to the at least one processor and storing programming instructions for execution by the at least one processor to cause the apparatus to:
receive configuration information from a network device, wherein the configuration information identifies Q demodulation reference signal (DMRS) ports used for measurement, and Q is a positive integer;
receive indication information from the network device, wherein the indication information indicates M DMRS ports, in the Q DMRS ports used for measurement, that carry downlink data, M is a positive integer, and Q is greater than M; and
send channel information of P DMRS ports to the network device, wherein the P DMRS ports belong to the Q DMRS ports used for measurement, and P is a positive integer, and wherein the P DMRS ports belong to P1 DMRS port groups, and a quantity of DMRS ports comprised in each of the P1 DMRS port groups is M, and P1 is a positive integer, wherein the P1 DMRS port groups comprise one DMRS port group to which the M DMRS ports that carry the downlink data belong and P1-1 DMRS port groups of best channel quality among DMRS port groups to which other DMRS ports belong, wherein the other DMRS ports are DMRS ports other than the M DMRS ports that carry the downlink data in the Q DMRS ports used for measurement.

6. The apparatus according to claim 5, wherein the P1 DMRS port groups comprise a first DMRS port group and a second DMRS port group, and the first DMRS port group and the second DMRS port group correspond to different code division multiplexing (CDM) groups.

7. The apparatus according to claim 5, wherein the channel information comprises numbers of the P1 DMRS port groups.

8. The apparatus according to claim 7, wherein the channel information further comprises a channel quality indicator (CQI) of the P DMRS port groups, modulation and coding scheme (MCS) information of the P1 DMRS port groups, or a combination of the CQI and the MCS.

9. An apparatus, comprising:
at least one processor; and
one or more memories coupled to the at least one processor and storing programming instructions for execution by the at least one processor to cause the apparatus to:
send configuration information to a terminal device, wherein the configuration information identifies Q demodulation reference signal (DMRS) ports used for measurement, and Q is a positive integer; and send indication information to the terminal device, wherein the indication information indicates M DMRS ports, in the Q DMRS ports used for measurement, that carry downlink data, M is a positive integer, and Q is greater than M; and
receive channel information of P DMRS ports from the terminal device, wherein the P DMRS ports belong to the Q DMRS ports used for measurement, and P is a positive integer, and wherein the P DMRS ports belong to P1 DMRS port groups, and a quantity of DMRS ports comprised in each of the P1 DMRS port groups is M, and P1 is a positive integer, wherein the P1 DMRS port groups comprise one DMRS port group to which the M DMRS ports that carry the downlink data belong and P1-1 DMRS port groups of best channel quality among DMRS port groups to which other DMRS ports belong, wherein the other DMRS ports are DMRS ports other than the M DMRS ports that carry the downlink data in the Q DMRS ports used for measurement.

10. The apparatus according to claim 9, wherein the P1 DMRS port groups comprise a first DMRS port group and a second DMRS port group, and the first DMRS port group and the second DMRS port group correspond to different code division multiplexing (CDM) groups.

11. The apparatus according to claim 9, wherein the channel information comprises numbers of the P1 DMRS port groups.

12. The apparatus according to claim 9, wherein the channel information further comprises a channel quality indicator (CQI) of the P1 DMRS port groups, modulation and coding scheme (MCS) information of the P1 DMRS port groups, or a combination of the CQI and the MCS information.

* * * * *